under so sought to be the feat.

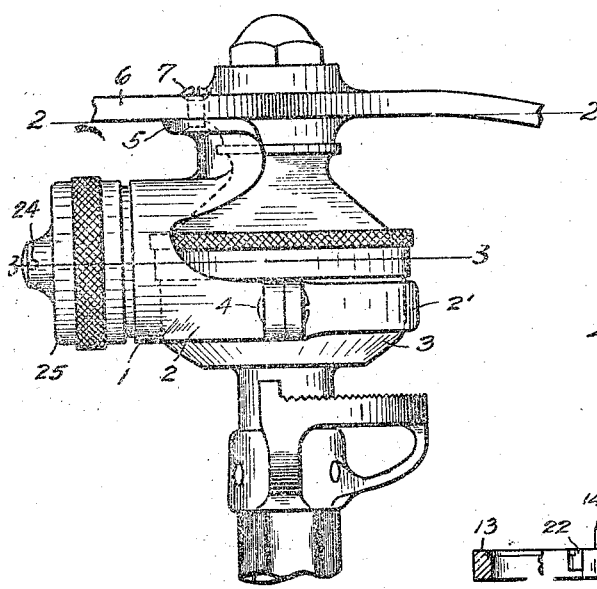

UNITED STATES PATENT OFFICE.

JOHN STANLEY, OF SEATTLE, WASHINGTON, ASSIGNOR OF ONE-FOURTH TO PIERRE BARNES, OF SEATTLE, WASHINGTON.

AUTOMOBILE-LOCK.

1,257,039.

Specification of Letters Patent.    Patented Feb. 19, 1918.

Application filed September 26, 1917. Serial No. 193,228.

*To all whom it may concern:*

Be it known that I, JOHN STANLEY, a citizen of the United States, residing at Seattle, in the county of King and State of Washington, have invented certain new and useful Improvements in Automobile-Locks, of which the following is a specification.

My invention relates to improvements in automobile locks, and the object of my invention is to provide a simple, practical, and efficient device adapted for attachment to the steering column, the use of which enables the steering shaft to be locked to the steering column when the car is stationary, the front wheels being inclined to one side or the other, as the case may be, so as to prevent the wheels being brought into the straight-ahead position, thus rendering it impossible to drive, push or otherwise propel the car ahead until the lock is withdrawn.

I attain this object by the construction illustrated in the accompanying drawings, in which—

Figure 1 is a side elevational view of my device applied to the steering column of an automobile. Figs. 2 and 3 are sectional views taken substantially through 2—2 and 3—3 of Fig. 1. Fig. 4 is a sectional view through 4—4 of Fig. 3. Fig. 5 is a side elevation, partly in section, and a plan view of the lock's outer ring. Figs. 6 and 7 are views similar to Fig. 5 of the crown piece and of the inner ring, respectively. Fig. 8 is a fragmentary elevational view of the crown piece to illustrate the preferred form of teeth therefor.

My device is formed of a hollow boss 1 provided with a half clamp portion 2 whereby it may be rotatably attached to the steering column or gear case 3, as shown in Fig. 1, by means of a complementary clamp portion $2^1$ through the medium of riveted screws 4. Said boss is provided with apertured lugs 5 disposed to fit against the arms, such as 6, of a steering wheel spider, and to which the boss is rigidly secured by riveted screws, as 7.

Made integral with and extending inwardly from the outer end $1^1$ of the boss is a sleeve $1^2$ which serves as a guide for a locking bolt 8 disposed axially of the boss and adapted to engage in an aperture 9 provided in the peripheral wall of the gear case 3.

Rotatably mounted upon the sleeve $1^2$ is an inner ring 10. From said ring extend two pin members 11 and 12 which are securely fastened in holes provided therefor in the inner face of the ring. An outer ring 13 is rotatably seated against the outer end $1^1$ of the boss and is provided with a pin 14 extending from its inner face.

Interposed between said inner and outer rings is a crown piece 15 on the inner face of which is a plurality of serrations or teeth 16, the end serrations having squared faces $16^1$, as shown in Fig. 6. The crown piece is seated in an annular groove 17 provided in the boss end $1^1$ and is rigidly secured to the latter by screws 18, as shown in Fig. 3.

The thickness of the crown piece 15 where it abuts the outer end of the boss 1, is reduced to form shoulders, as 19, which seat against opposing shoulders provided on said inner and outer rings to retain the same in operative positions against the outer end of the boss.

The crown piece 15, inner ring 10 and outer ring 13 are each provided with a slot, as indicated respectively in Figs. 6, 7 and 5 by numerals 20, 21 and 22, and as the crown piece is stationary and the ring pin 14 rotatable, it will be evident that the slots 21 and 22 may be brought to register one with the other and with the slot 20 in the crown piece to afford a continuous slot, as indicated by 23 in Fig. 4.

The outer end of bolt 8 is secured by means of rivet 24 to a cap 25 which incloses the outer end of the boss 1 and is rotatable thereon.

Within said boss and extending radially from said arbor is a finger 26, the purpose of which is more fully described hereinafter. The length of the bolt 8 is such that it may engage in the aperture 9 of the casing 3 when the cap 25 is in the position shown by full lines in Fig. 3.

27 represents a spring mounted on the bolt 8 between the cap 25 and the end of the boss, and which spring tends to yieldingly hold the cap in the position in which it is indicated by broken lines $25^1$ in Fig. 3.

The manner in which my lock is used and operates may be described briefly as follows:

The device, as above explained, is fixedly secured to the steering wheel spider so that the locking bolt is positioned to engage in the hole 9 of the casing 3 when the front wheels of the vehicle to which my invention is applied are inclined a certain amount to the right or left, as the case may be, the diameter of said hole being such that the locking bolt will fit slidably therein.

When the vehicle wheels are in the straight-ahead position, the device is in the unlocked position; that is, the locking bolt 8 is clear of the opening in the casing, and the boss and steering wheel are therefore free to move in either rotary direction, the cap 25 being then in its outermost position, as indicated by the dotted lines in Fig. 3, while the finger 26 occupies the slot 23. On the car being brought to a standstill and it being desired to lock the front wheels, they are inclined to the right or left, as required, until the locking bolt 8 registers with the opening in the casing, whereupon the cap 25 may be pushed inwardly to engage the point of the locking bolt in the gear casing 3. This movement carries the finger 26 out of the slot 23 clear of the teeth of the crown piece 15 when, by giving the cap a turn to the right or left, the rings 10 and 13 will be moved to break the continuity of slot 23 and the wheels will be locked, as the locking bolt cannot be withdrawn unless the combination necessary to effect the return of the finger 26 into slot 23 is known.

To unlock the wheels, the cap 25 is first of all turned to the right until finger 26 strikes a square face $16^1$ on the crown piece 15, this being the starting position for unlocking. The cap is then pressed inwardly and turned to the right at the same time feeling the contact of finger 26 with the teeth of the crown piece and counting each tooth until the finger contacting with pin 14 carries ring 13 around till its slot 22 registers with the slot 20 of the crown piece. The cap 21 is then similarly turned to the left until finger 26 contacting with pin 11 carries ring 10 around till its slot 21 registers with crown piece slot 20 whereupon the continuous slot 23 will be formed, when by pressing down on and turning the cap to the right until the finger 26 registers with the slot 23 it, the finger 26, will be carried thereinto by the spring 24 and thus the point of the locking pin will be withdrawn from engagement with the steering shaft to permit turning of the same.

It will be noted that in order to effect the unlocking of the front wheels, it is necessary to know the combination; that is, the number of teeth 16 over which the finger 26 must be passed first in one direction and then the other to obtain the continuity of the slot 23, and as this knowledge is confined to the operator of the car, it will be obvious that unauthorized unlocking of the wheels is impossible.

Many different combinations may be obtained by setting the pins 11 and 14 in different positions on rings 10 and 13, from which it will be seen that I have provided a lock for automobiles which is of great utility to the owner of a car and adds greatly to his security in the possession of the same.

What I claim as my invention, is—

1. In an automobile, the combination with steering mechanism including a column having an aperture in its periphery, and a steering wheel, of a boss rigidly connected to said wheel and revolubly attached to said column, a locking bolt provided in said boss and engageable in said column aperture, means provided within the boss for securing said bolt in its locked position with respect to said column, a cap at the outer end of the boss and secured to the bolt for turning the latter to regulate said means, and also serving to move the bolt into operative position with respect to said column, and a spring serving to disengage the bolt from said column after said means have been regulated through the medium of the cap and bolt.

2. In an automobile, the combination of a steering column, a steering wheel rotatably mounted on the upper end thereof, a hollow boss rigidly connected to said wheel, a bolt within said boss and engageable with said column to secure the wheel against rotation, locking mechanism within the boss for releasably securing said bolt in its engaged position with respect to said column, a cap mounted on said boss for axial and rotary movements with respect to the boss, said bolt being rigidly connected to said cap whereby the latter is employed to regulate said locking mechanism and effect the engagement of the bolt with said column, and a spring interposed between the outer end of said boss and the cap and tending to yieldingly hold said bolt in disengaged position with respect to said column.

Signed at Seattle, Washington, this 20th day of September, 1917.

JOHN STANLEY.

Witnesses:
 PIERRE BARNES,
 E. PETERSON.